United States Patent [19]
Dorr

[11] Patent Number: 4,638,155
[45] Date of Patent: Jan. 20, 1987

[54] OPTOELECTRONIC MEASURING DEVICE

[75] Inventor: Konrad Dorr, Leonberg, Fed. Rep. of Germany

[73] Assignee: Dr.Ing.h.c.F. Porsche Aktiengesellschaft, Fed. Rep. of Germany

[21] Appl. No.: 692,985

[22] Filed: Jan. 22, 1985

[30] Foreign Application Priority Data

Jan. 20, 1984 [DE]  Fed. Rep. of Germany ....... 3401858

[51] Int. Cl.⁴ .............................................. G01D 5/34
[52] U.S. Cl. .............................. 250/231 SE; 324/175; 73/505
[58] Field of Search .............. 250/231 SE; 340/347 P; 324/175, 166; 73/488, 505, DIG. 11

[56] References Cited

U.S. PATENT DOCUMENTS 4,196,629  4/1980  Philips ............................. 324/175 X

FOREIGN PATENT DOCUMENTS 3133401  8/1981  Fed. Rep. of Germany .

OTHER PUBLICATIONS

Fotoelektronische Naeherungsschalter, from Lothar Schlueter KG (company brochure).
Article on Fibre Optic Sensors by M. de Mendez, J. J. Dumont, and P. Amberny, Dec. 1980, pp. 313-316, from Optic and Laser Technology.
Bosch Technical Reports, vol. 7, pp. 140-141 (1981).

Primary Examiner—Eugene R. LaRoche
Assistant Examiner—Robert J. Pascal
Attorney, Agent, or Firm—Barnes & Thornburg

[57] ABSTRACT

An apparatus for the Optoelectronic Measuring of the rotational speed of a shaft, and in particular the rotational speed of a shaft of a turbosupercharger which is part of an internal combustion engine. This apparatus makes it possible to measure the rotational speed of such a shaft in a simple, reliable, and cost-effective manner by utilizing an amplitude modulated pencil of light which is converted into a usable electronic signal by a special electronic evaluating system. The light modulator is a component already existing on the turbosupercharger shaft, thereby further reducing complexity and cost.

14 Claims, 8 Drawing Figures

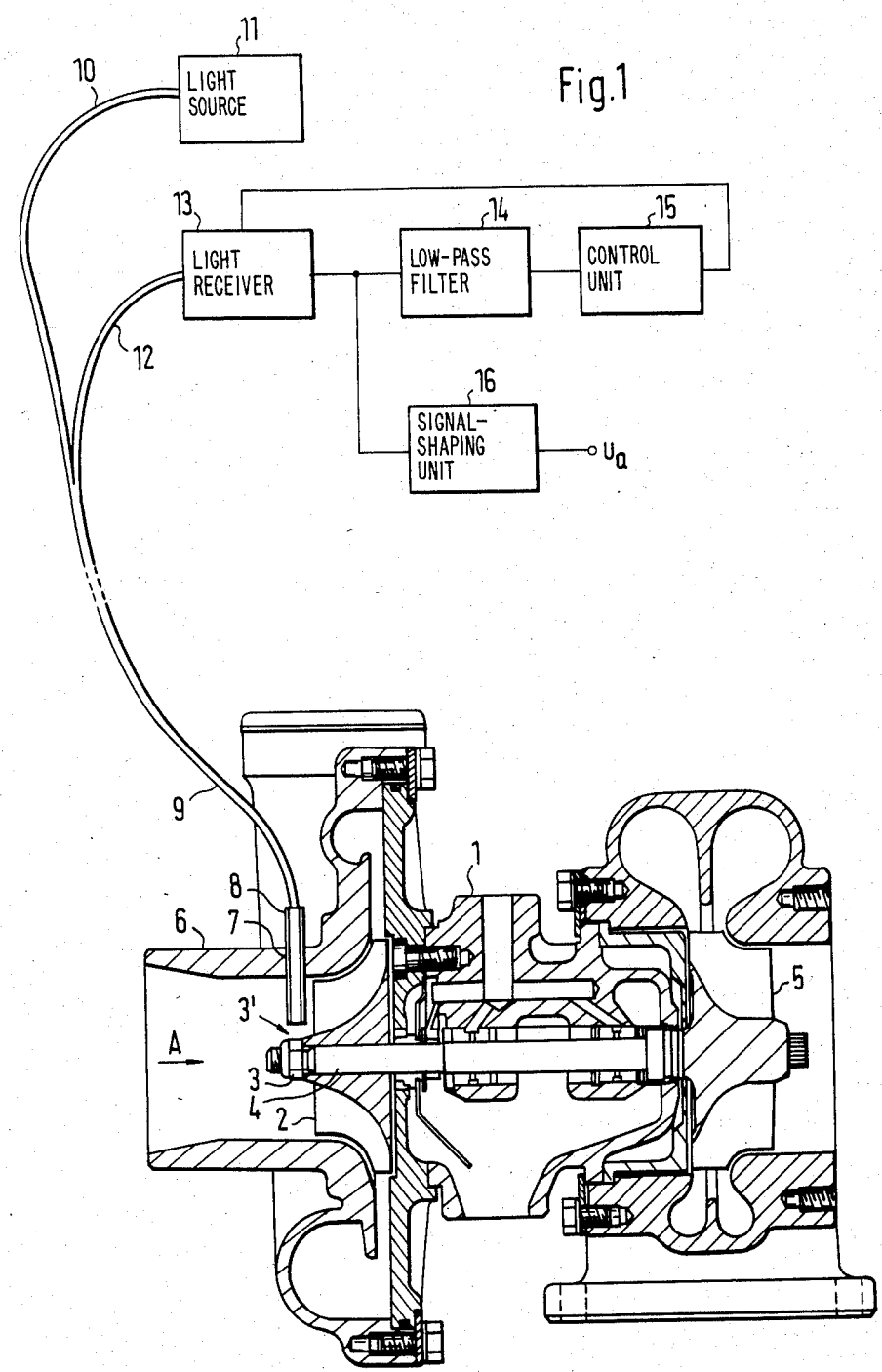

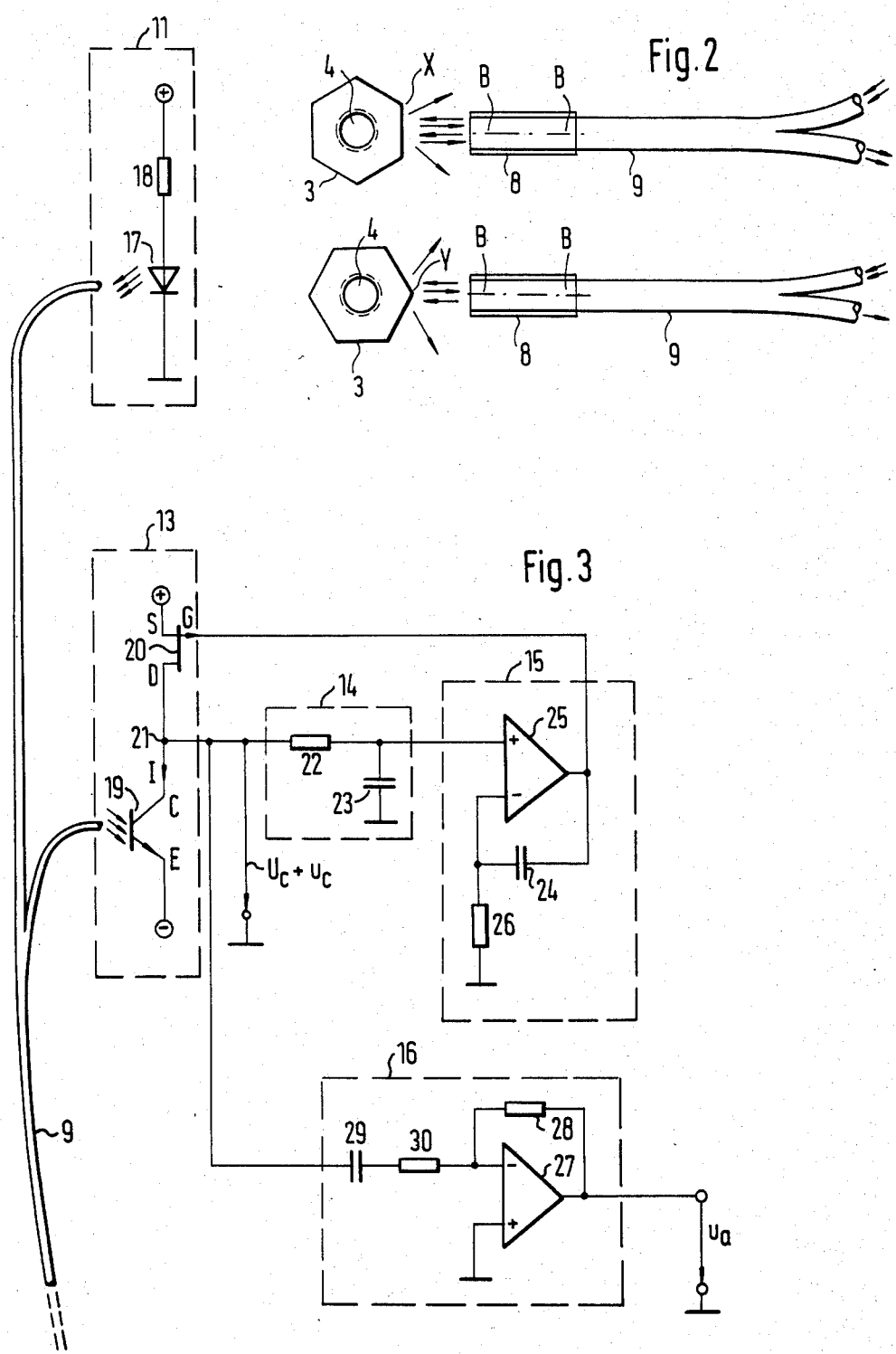

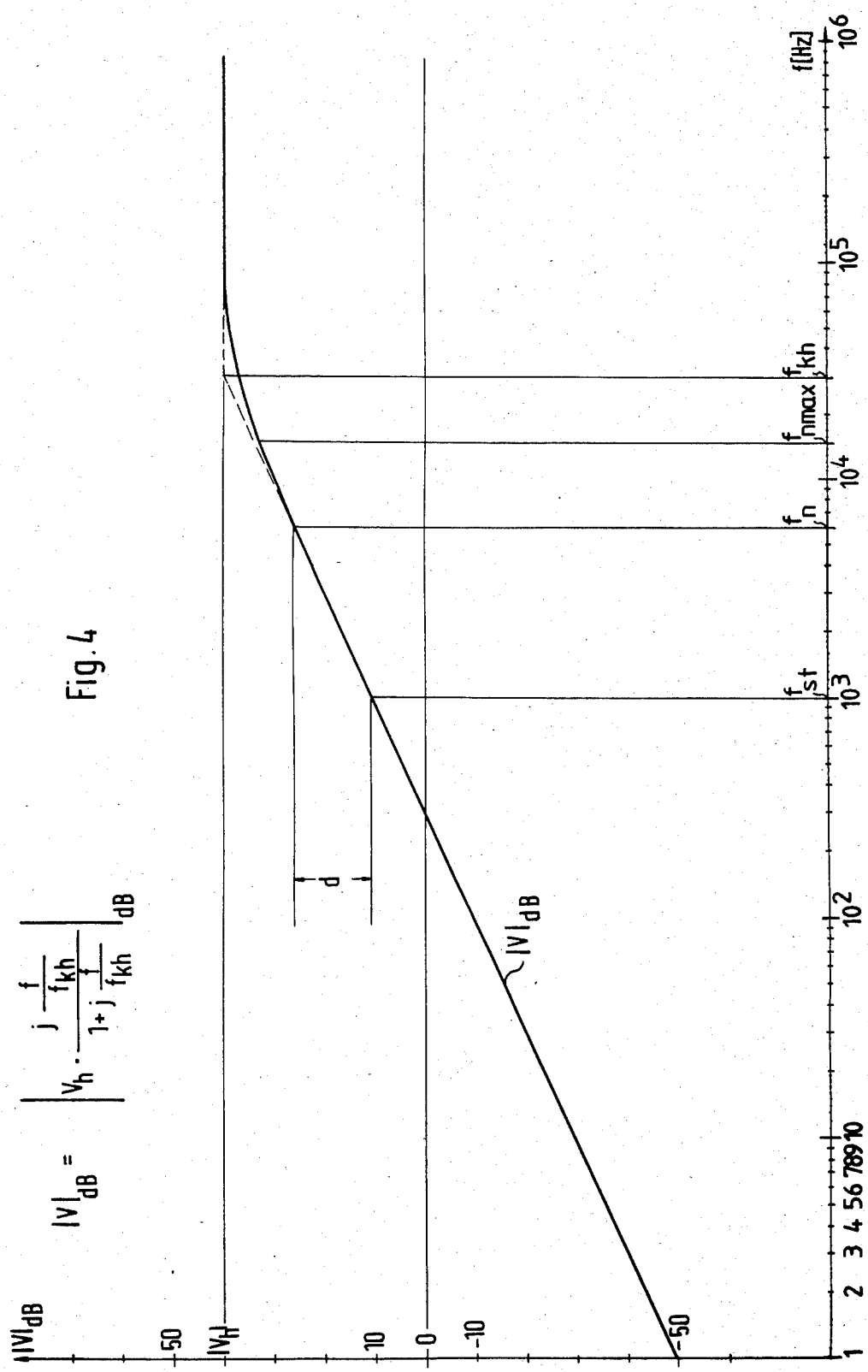

OPTOELECTRONIC MEASURING DEVICE

BACKGROUND AND SUMMARY OF THE INVENTION

This invention relates to optoelectronic devices used to measure the rotational speed of a rotating shaft, and more particularly to optoelectronic devices used to measure the rotational speed of a shaft of a turbosupercharger installed on an internal combustion engine.

For the design and optimization of internal combustion engines which have turbosuperchargers installed on them, it is necessary to measure the rotational speed of the turbosupercharger shaft because conclusions can be drawn from these measurements related to the response behavior of the turbosupercharger, which is directly related to the power behavior of the internal combustion engine itself.

In automotive engineering, inductive pulse generators are as a rule used for measuring the speed of shafts. "Bosch Technische Berichte" (Bosch Technical Reports), Volume 7 (1981), Issue 3, Page 140-141, shows such a pulse generator that is designed as a passive magnetic stray field sensor. These pulse generators operate on the theory that on at least part of the shaft ferromagnetic "marks" exist or may be mounted, such as the steel teeth on the toothed rim of the flywheel disk, or a steel or iron pin placed in a rotating part of an internal combustion engine.

It is possible to measure the speed of the shaft of the turbosupercharger by means of such a pulse generator mounted in the turbosupercharger housing by counting the charging wheel blades passing the pulse generator per time unit. However, since the blades of a turbosupercharger generally are formed from materials which are either non-ferromagnetic or are otherwise unsuitable for providing sufficient magnetic return, turbosuperchargers to be so measured must be constructed correspondingly by providing them with ferromagnetic "marks" on the charger wheel. This results in increased costs and problems with balance errors. In addition, in turbosuperchargers high temperatures (up to about 280°) normally occur, especially after the internal combustion engine is shut off, which can damage the insulating materials of the pulse generator.

Further problems with pulse generators are caused by components of the commonly used high-capacity ignition systems being located in direct proximity to the turbosuperchargers since the pulse generators are sensitive to high value stray electromagnetic fields. The resulting interferences can not be filtered out of the measuring signal.

Still further problems with pulse generators are caused by the requirement for exact positioning of the pulse generators in such a highly stressed part of the internal combustion engine.

An apparatus for measuring the rotational speed of a vehicle wheel is known from DE-OS No. 3,036,846 (German Published Unexamined Patent Application). That apparatus locates the temperature-sensitive and shock-sensitive electronic system for the signal regeneration and processing about 10 cm away from the speed sensor on the vehicle wheel. The speed sensor and electronic signal processing system are connected via electric leads or optical-guide cables. Although this apparatus does allow the most temperature-sensitive and shock-sensitive components to be located away from the measuring point, the speed sensor is still located in a dangerous area. The speed sensor is then connected with the electronic processing system via a connecting lead that is insensitive to temperature and secure with respect to stray fields.

One disadvantage of this type of system is that the connecting lead between the speed sensor and the electronic processing system is generally only 10 cm to 15 cm in length. This length is too short for a turbosupercharger application because the electronic system would have to be located in an area which is continuously subjected to high temperatures and high capacitive and electromagnetic stray fields. For a turbosupercharger application it is desirable that the entire electronic processing system be located in a measuring area of an internal combustion engine testing stand or in the area of the dashboard of a motor vehicle to be tested.

Another disadvantage of this type of system is the requirement for a special modulator which cannot be mounted on the shaft of a turbosupercharger or can only be mounted with great difficulty. These modulators require high finishing accuracy, an exact concentricity, and a precise centering during the mounting which makes them expensive.

One objective of the present invention is to provide an apparatus for the optoelectronic measuring of the rotational speed of a shaft such that the apparatus can be not only mounted easily, but is also isolated from, and insensitive to, shock, high temperatures, and relatively strong electromagnetic and capacitive stray fields.

According to the present invention, an optoelectronic measuring device is provided which can measure the rotational speed of a shaft, and more particularly the rotational speed of a turbosupercharger shaft where the turbosupercharger is a part of an internal combustion engine. The measuring device is able to function without a special modulator and without the restriction of a short connecting lead between the sensor unit and the receiving unit. This permits the mounting of only the sensor unit to the turbosupercharger which requires no significant structural changes while the receiving unit may be located in a convenient area some distance away. This mounting method permits the acquisition and processing of interference free signals and further permits the apparatus to be manufactured in a simple and cost efficient manner.

Further objects, features and advantages of the present invention will become more apparent from the following description when taken with the accompanying drawings which show, for purposes of illustration only, an embodiment in accordance with the present invention.

BRIEF DESCRIPTION OF THE DRAWINGS

FIG. 1 is a block diagram of the apparatus according to the present invention adapted for use with a turbosupercharger shown in diagramatic section;

FIG. 2 is an enlarged diagramatic view taken in the direction of the Arrow A of FIG. 1 showing the functional relation between hex nut 3 and light guiding means 9;

FIG. 3 is a schematic diagram of a light source and a light receiver with the accompanying electronic system;

FIG. 4 is a Bode diagram showing an amplification line of a signal shaping means;

DETAILED DESCRIPTION OF THE DRAWINGS

Figure 5A:
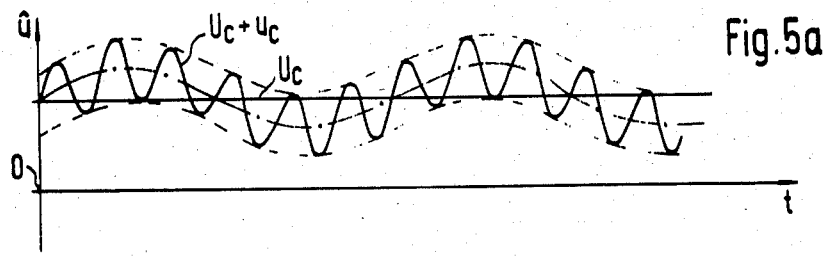
FIG. 5 shows diagrams of the time sequence of: (a) an output signal of the light receiver component without a regulation of the operating point; (b) an output signal of the light receiver component with the regulation of the operating point; (c) a beat or interfering signal that is superimposed on the wanted signal; (d) an output signal of the signal shaping step largely corresponding to the wanted signal.

A turbosupercharger 1 is shown in FIG. 1 with a charger wheel 2 fastened on a shaft 4 by means of a hexagon nut 3, the shaft frictionally connecting the charger wheel 2 with the exhaust gas turbine wheel 5. A bore 7 is provided in the air inlet 6, the axis of which points radially inward toward the hexagon nut 3. A sleeve 8 is fastened in this bore 7 by means of screws, clamps, or gluing, said sleeve 8 securing the pencil of light guiding means 9 by its first end closest to a light modulator 3'.

At the second end of the pencil of light guiding means 9, said guiding means 9 is split into two approximately equal halves 10, 12. Light from a light source 11 is coupled into the first half 10 of the pencil of light guiding means 9 and is forwarded from there to the measuring point, which is the hexagon nut 3 serving as the light modulator 3'. The light coming out of the pencil of light guiding means 9 is reflected diffusely from the hexagon nut 3. Depending on the respective position of the hexagon nut 3 relative to the sleeve 8, a larger or smaller part of the reflected light reenters the pencil of light guiding means 9. The reflected light that is coupled back into the pencil of light guiding means 9 is thus modulated in its amplitude.

By means of the second half 12 of the split pencil of light guiding means 9, the reflected light that was coupled back is directed out of the pencil of light guiding means 9 to the light receiver component 13. The operating point of the light receiver component 13 is regulated by means of a low-pass filter 14 that has an integral control unit 15 connected at its outlet side. An output signal of the light receiver component 13 is directed to a signal shaping unit 16, the resulting output being a perfectly processable signal (output signal) $u_a$, the frequency of which is proportional to the rotational speed of the shaft of the turbosupercharger. The output signal of the signal shaping unit 16 $u_a$, via a frequency-voltage transformer, may be directed to an indicator, or may be processed by a trigger circuit with a frequency counter or a process control computer connected to the outlet side.

FIG. 2 shows the light modulating effect of the hexagon nut 3. Hexagon nut 3 has a continuous outer surface which consists of 6 faces and 6 edges, each edge being defined by the cooperation of two adjacent faces. When a face of the hexagon nut 3 proximate to sleeve 8 is orthogonal to the axis B—B of the sleeve 8, the largest part of the light portion coming vertically out of the pencil of light guiding means 9 is reflected back into the pencil of light guiding means 9 by the face of the hexagon nut 3 (position X of the hexagon nut). When an edge of the hexagon nut 3 proximate to sleeve 8 is aligned with axis B—B of the sleeve 8, the largest part of the light coming out of the pencil of light guiding means 9 is reflected by the edge or by the faces adjacent to the edge of the hexagon nut such that only a very small part of the exiting light returns to the pencil of the light guiding means 9 (Position Y of the hexagon nut).

In this manner, when the shaft 4 is rotated, the light that is reflected into the pencil of light guiding means 9 is modulated by the hexagon nut 3 in its amplitude.

FIG. 3 shows wiring diagrams of the light source 11 and of the light receiver 13 with its accompanying electronic systems.

The light source 11 consists of an infrared light emitting diode 17, the anode of which, via a multiplier resistor 18, is connected to a positive distribution voltage and the cathode of which is connected to a ground potential.

The light receiver component 13 comprises a phototransistor 19 which selectively responds to infrared light, the emitter E of said phototransistor 19 being fed by a negative distribution voltage, and the collector C of said phototransistor 19 being connected to the positive distribution voltage via the drain-source line of a field effect transistor (FET) 20 used as a changeable collector resistor.

The use of infrared light provides the measuring apparatus with extensive insensitivity with respect to outside light and contamination.

At the connecting point 21 between the collector C of the phototransistor and the drain D of the FET, the collector direct voltage $U_c$ (operating point) is supplied on which the wanted and interference voltage signals (collector alternating voltage $u_c$) are superimposed.

In order to make the collector direct voltage $U_c$ independent of disturbances in the path of light transmission, such as, for example, contamination of the end of the light guiding means or of the hexagon nut 3, distance from the sleeve 8 to the hexagon nut 3, fluctuations of the light current of the light source, and the varying degree of reflection of the hexagon nuts of different turbosuperchargers, it is necessary to regulate the photocurrent I in such a way that the constant collector direct voltage $U_c$ is adjusted with respect to time. In the present invention it is advantageous to regulate the collector direct voltage $U_c$ to the ground potential, thus to the zero value.

For regulating the collector direct voltage $U_c$ to ground potential, a low-pass filter 14 of the first order is connected to the collector C which largely suppresses the collector alternating voltage $u_c$ with respect to the collector direct voltage $U_c$. The low-pass filter 14 is switched in a known manner as an RC-section (series resistor 22 and by-pass capacitor 23 against ground potential). Its break-point frequency should be at least two powers of ten below the smallest, still occuring measuring frequency. The low-pass filter 14 is followed by an integral control unit 15. This integral control unit 15 is switched as a non-inverting integrator (with an operational amplifier 25 that is countercoupled to a condenser 24, the inverting input of said amplifier 25 being returned to ground via a resistor 26). This integral control unit 15 controls gate G of the FET 20 and thus changes its drain-source resistor which serves as a changeable collector resistor. Because of the integrating behavior of the control circuit, the collector direct voltage $U_c$ is thus regulated to the value zero.

At the connecting point 21, there therefore occurs a pure alternating signal, the collector alternating voltage $u_c$ which is an additive combination of the wanted signal $u_{cn}$ and the interference signals $u_{cs}$. Because of the open base of the phototransistor 19, the amplitude of the collector alternating voltage is low and in addition decreases with an increasing frequency by 20 dB per decade. In addition, the shaft of the turbosupercharger starts to wobble at higher speeds (at about 80,000 revolutions per minute). Consequently, an interference signal $u_{cst}$ in the form of a beat superimposes itself on the wanted signal. The frequency $f_{st}$ of this beat is one sixth of the frequency $f_n$ of the wanted signal because the hexagon nut 3 produces six approximately sinusoidal signals per revolution of the shaft, whereas only one signal per revolution of the shaft is produced by the wobbling of the shaft. However, the amplitude of the interference signal $u_{cst}$ that is created by the wobbling of the shaft is large and may amount to up to 100% of the amplitude of the wanted signal. A reliable triggering (acquisition of the crossovers) of the $u_c$ signal therefore does not exist (other interference signals occur with a significantly lower amplitude, and may therefore be neglected).

For these reasons, a signal regeneration by means of a signal shaping unit 16 is required. This signal shaping unit 16, according to the present invention, is developed as an active high pass of the first order (delayed differentiating amplifier) having an operational amplifier 27 which is countercoupled via a resistor 28. The collector alternating voltage $u_c$ is supplied to the inverting input of the operational amplifier 27 via a resistor 30 connected in series with a capacitor 29 while the non-inverting input is returned to ground potential. The break-point frequency $f_{kh}$ of the active high pass of the first order is designed in such a way that it is approximately twice, but at least 1.4 times ($\sqrt{2}$ times) as high as the highest occurring frequency of the measuring range. The amplification factor $V_h$ can be adjusted to meet the requirements of the attached indicating components.

FIG. 4 shows a Bode diagram of the amplification line of the signal shaping step. Above the logarithmically divided abscissa, the frequency is entered in hertz (Hz); the linearly divided ordinate shows the amount of amplification $|V|$ in decibels (dB) in steps of 10 dB/cm. In the present embodiment the amplification factors $|V_n|_{dB}$ is assumed to be 40 dB. The amplification line $|V|_{dB}$ is drawn out thickly while the asymptotes approximating it are drawn in dashed lines. Also entered on the abscissa are the highest occurring frequency $f_{max}$ at 15 kHz, the break-point frequency $f_{kh}$ at 30 kHz and a measuring point $f_n$ at 6 kHz as well as the pertaining frequency $f_{st}$ of the beat at 1 kHz. The ordinate direction contains the damping d of the beat pertaining to the two last-mentioned frequencies with respect to the useful signal which in the least favorable case is about 14 dB.

As a result of the amplification line of the signal shaping step rising in the used frequency range at a rate of 20 dB per decade with respect to the frequency, two useful benefits are realized. First, a constant output level of the measuring apparatus is maintained throughout the useful frequency range. Second, the amplitude of the superimposed (beat) interference signal $u_{cst}$ is damped by about 14 dB so that the output signal of the measuring apparatus $u_a$ can be processed or triggered perfectly. By having the amplification line of the signal shaping step change into a horizontal line above the measuring range, the excessive amplification of parts of the interference signals $u_{cs}$ of a higher frequency is avoided.

Figure 5B:
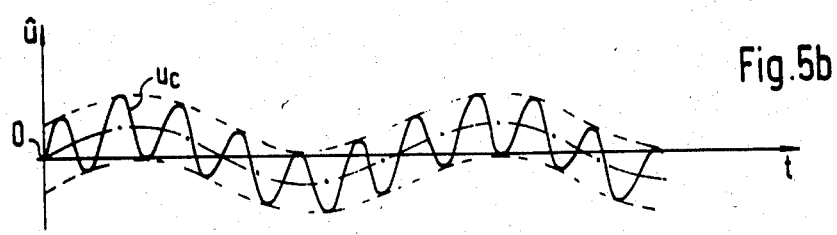
Figure 5C:
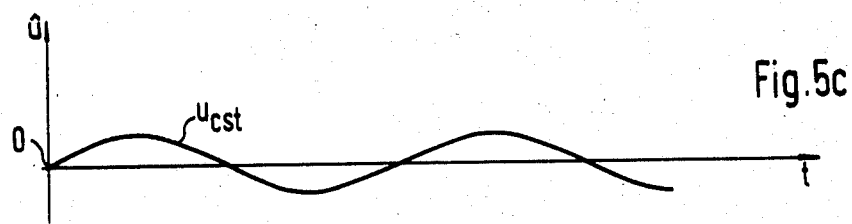
Figure 5D:
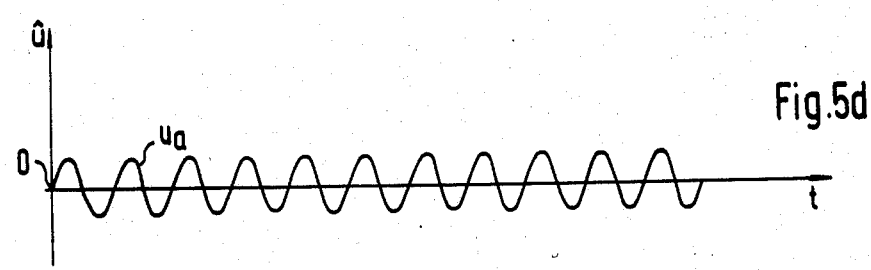

FIG. 5 shows the time sequence: (a) of the output signal of the light receiver component 13 without regulation of the operating point; (b) with regulation of the operating point; (c) the (beat) interference signal $u_{cst}$; (d) the output signal of the signal shaping unit where time is always entered on the abscissa, and the amplitude u of the signals is entered on the ordinate. At (a) and (b), the (beat) interference signal $u_{cst}$ is entered as a dash-dotted line, and the envelope curves delimiting the signal are indicated in dashed lines.

Naturally, the apparatus is not limited to the measuring of the rotational speed of the shaft of a turbosupercharger. It may be used wherever suitable "light modulators" in the form of nuts, notches, teeth or similar means exist on the shafts and higher pulse numbers occur per time unit. Contamination has no effect on the apparatus provided there is no wetting of the end of the light guiding means with liquids or with large amounts of light-absorbing solid matter. The modulator, on the other hand, may be contaminated in any way and no special demands are made on its concentricity. In the case of other applications, the electronic system need only be adapted correspondingly. In particular, it may be necessary to connect a low-pass filter to the outlet side of the signal shaping step when high-frequency interferences are superimposed on the measuring signal. The break-point frequency of this low-pass filter must then be above the break-point frequency of the active high-pass filter.

Since the measuring point may be separate some distance from the sensitive electronic system for the signal regeneration and processing, and in the case of the apparatus according to the present invention this distance may be up to 10 m, it is possible to reliably determine the speed or the position of shafts at locations with very "rough" environmental conditions (high temperatures, radiation, electric and magnetic stray fields, shocks, etc.). It is understood that when modern technology is used, such as, lasers as the light source, better light guiding means, and more sensitive light receivers, much larger distances may be bridged. The simple mounting, the uncomplicated adjusting, and the low costs are other advantages of the described apparatus.

Although the invention has been described in detail with reference to certain preferred embodiments and specific examples, variations and modifications exist within the scope and spirit of the invention as described and defined in the following claims.

What is claimed is:

1. An apparatus for the optoelectronic measuring of the speed of a shaft, especially of a turbosupercharger shaft, comprising: a light modulator affixed to the shaft, a light source, and a light receiver component having an evaluating electronic system connected to its outlet side, a pencil of light guiding means having a first and second end for the optical transmission of signals, the pencil of light guiding means consisting essentially of several individual fibers and, at its second end facing away from the light modulator, being split into two approximately equal halves for the coupling-in of light from the light source and the coupling-out of light to the light receiver component, the light modulator consisting of a component already existing on the shaft which over its circumference has varying degrees of reflection and reflects the light in a radial direction, and wherein the light receiver component includes a phototransistor for receiving coupled-out light, the emitter (E) of which is connected to a negative distribution voltage, and the collector of which is connected to a positive distribution voltage by means of a changeable collector resistance that is controlled by a low-pass filter having an integral control unit connected to its outlet side and is switchably connected to a ground potential, and the collector being additionally connected to a signal shaping unit for obtaining a processable alternating signal of a frequency that is proportional to the rotational speed.

2. The apparatus of claim 1, wherein the light modulator consists of a hexagonal nut for fastening the charger wheel to the shaft of the turbosupercharger.

3. The apparatus of claim 2, wherein the first end of the pencil of light guiding means facing the light modulator is aimed radially at the light modulator.

4. The apparatus of claim 3, wherein the first end of the pencil of light guiding means that faces the light modulator is contained in a sleeve fastened by means of screws, clamps or gluing in a bore extending radially to the hexagon nut in an air inlet of the turbosupercharger.

5. The apparatus of claim 1, wherein the individual fibers of the pencil of light guiding means are fiber glass.

6. The apparatus of claim 1, wherein the changeable collector resistance is a field effect transistor.

7. The apparatus of claim 1, wherein the low-pass filter is designed as a low pass of the first order, and wherein its break-point frequency is at leat two powers of ten lower than the lowest occurring measuring frequency.

8. The apparatus of claim 1, wherein the signal shaping unit comprises an active high pass filter of the first order (delayed differentiating member) and wherein its break-point frequency is approximately twice as high, but at least 2 times as high as the highest occurring measuring frequency.

9. The apparatus of claim 1, wherein the light source comprises an infrared light emitting diode and the phototransistor selectively responds to infrared light.

10. An appartus for the optoeletronic measuring of the speed of a shaft, such as a turbosupercharger shaft or the like, comprising:
a light modulator affixed to the shaft, a light source, and a light receiver component having an evaluating electronic system connected to its outlet side, a pencil of light guiding means having a first and second end for the optical transmission of signals, the pencil of light guiding means including a plurality of individual fibers and, at its second end facing away from the light modulator, being split into plural portions for the coupling-in of light from the light source and the coupling-out of light to the light receiver component, the light modulator exhibiting a radially outwardly facing circumference having varying degrees of reflection for reflecting varying amounts of light at said first end of said pencil of light guiding means facing said light modulator, and for reflecting varying amounts of light diffusely in a direction away from said first end of said pencil of light guiding means facing said light modulator, and wherein the light receiver component is operatively connected to converter means for converting the detected coupled-out light signal to a shaft speed indicative signal.

11. The apparatus of claim 10, wherein the light modulator consists of a hexagonal nut for fastening the charger wheel to the shaft of the turbosupercharger.

12. The apparatus of claim 11, wherein the first end of the pencil of light guiding means facing the light modulator is aimed radially at the light modulator.

13. The apparatus of claim 12, wherein the first end of the pencil of light guiding means that faces the light modulator is contained in a sleeve fastened by means of screws, clamps or gluing in a bore extending radially to the hexagon nut in an air inlet of the turbosupercharger.

14. The apparatus of claim 10, wherein the individual fibers of the pencil of light guiding means are fiber glass.

* * * * *